United States Patent [19]

Stepper et al.

[11] Patent Number: 5,137,000
[45] Date of Patent: Aug. 11, 1992

[54] DEVICE AND METHOD FOR DECREASING DELAYS IN FUEL INJECTED INTERNAL COMBUSTION ENGINES

[75] Inventors: Mark R. Stepper, Columbus, Ind.; Edwin A. Johnson, Clarkston, Mich.

[73] Assignee: Cummins Electronics Company, Columbus, Ind.

[21] Appl. No.: 677,786

[22] Filed: Mar. 29, 1991

[51] Int. Cl.⁵ ............................................. F02D 41/04
[52] U.S. Cl. ................................... 123/478; 123/492; 123/493
[58] Field of Search ............... 123/478, 480, 486, 492, 123/493; 364/431.05

[56] References Cited

U.S. PATENT DOCUMENTS

| | | | |
|---|---|---|---|
| 4,700,681 | 10/1987 | Hanafusa et al. | 123/478 |
| 4,825,369 | 4/1989 | Oshizawa | 364/431.05 |
| 4,825,373 | 4/1989 | Nakamura et al. | 364/431.05 |
| 4,869,222 | 9/1989 | Klassen | 123/489 |
| 4,887,216 | 12/1989 | Ohnari et al. | 364/431.06 |
| 4,893,600 | 1/1990 | Holmes | 123/478 |
| 4,947,816 | 8/1990 | Nakaniwa et al. | 123/478 X |
| 4,955,339 | 9/1990 | Sasaki et al. | 123/478 X |
| 4,961,411 | 10/1990 | Oshiage et al. | 123/478 X |
| 4,987,876 | 1/1991 | Minamitani et al. | 123/478 X |

OTHER PUBLICATIONS

Lannan, Sisson, and Wolber, "Cummins Electronic Controls for Heavy Duty Diesel Engines", IEEE 88 CH2533-8 (Oct. 1988).

Primary Examiner—Willis R. Wolfe
Attorney, Agent, or Firm—Woodard, Emhardt, Naughton, Moriarty & McNett

[57] ABSTRACT

An engine control device for electronically controlling fuel injection of an engine is disclosed. The engine control device includes algorithms for instantaneously calculating fueling requirements in accordance with sensory inputs corresponding to engine operating conditions and throttle position. The fueling requirements are instantaneously reflected as modifications of the duration of fueling signals supplied to the fuel injectors, so that instantaneous fueling changes are effected. Fuel is conserved, and engine responsiveness improved in the current or presently occurring fuel injection cycle as a result of the immediate responsiveness of the engine control device operation.

16 Claims, 4 Drawing Sheets

DEVICE AND METHOD FOR DECREASING DELAYS IN FUEL INJECTED INTERNAL COMBUSTION ENGINES

FIELD OF THE INVENTION

This invention relates generally to fuel injected internal combustion engines and more particularly to electronic or electro-mechanical fuel injection systems.

BACKGROUND OF THE INVENTION

Electronic fuel injection systems typically include a digital computer for monitoring a variety of engine operating parameters, engine conditions and throttle or power outputs signals from a throttle sensor to produce fueling signals in response thereto. The fueling signals are supplied to electromechanical fuel injection devices. A great variety of fuel injection systems are known in the art. A few of those systems are discussed below.

Hanafusa et al., U.S. Pat. No. 4,700,681, discloses a fuel injection system for an internal combustion engine wherein each cylinder of the engine includes an individual fuel injector. The Hanafusa et al. device calculates a basic amount of fuel necessary for one engine cycle, and then a final injection amount is calculated as a difference between the basic amount of fuel required with respect to the actual amount of fuel injected during a preceding injection of the corresponding group of cylinders, which are grouped according to a phase relationship in view of the angular position of the crankshaft. Klassen, U.S. Pat. No. 4,869,222, discloses a control system and method for controlling actual fuel delivered by individual fuel injectors. A plurality of fuel command controllers provide a separate command signal to each fuel injector in response to a single base fuel command. The correction time period is calculated during a correction interval and each of the fuel command signals is offset in a predetermined sequence by a predetermined amount. Measurements of the average air/fuel ratios among the combustion chambers is taken during each correction interval. Air flow into the combustion chambers is also measured. In response to these measured parameters, the actual fuel delivered to each fuel injector is calculated. Ohnari et al., U.S. Pat. No. 4,887,216, discloses a method of engine control timed to engine revolution. Controlled measurement timings of air volume as well as fuel volume and exhaust gas parameters are included in calculating timing of fuel injection volume and ignition timing. These timings are synchronized with regard to a crank angle position such as top dead center. Nakamura et al., U.S. Pat. No. 4,825,373, discloses a fuel injection timing control apparatus for a diesel engine, including a determination of when actual ignition can be detected. The apparatus includes means for computing the target time at which injection should occur and means for sensing when injection actually occurs with respect to a reference crankshaft position. Feedback control means enable adjustment of the actual injection time to bring the previously mentioned parameters into coincidence with the target injection time. A compensation factor is computed based upon the difference between the actual and target firing times, and is utilized to modify the actual fuel injection timing so as to bring the actual and target firing times into coincidence. Oshizawa, U.S. Pat. No. 4,825,369, discloses an apparatus for controlling fuel injection timing of a fuel injection pump. The Oshizawa device includes a device for detecting a delay time of fuel injection due to the delay time of a solenoid valve which is opened/closed by a driving pulse. The solenoid valve controls fuel injection. The delay time of fuel injection is converted into the angle of a driving shaft of the pump corresponding to the delay time. A target advance angle according to the operating condition of an associated internal combustion engine is calculated and the output timing of the driving pulse is set by taking a count of the angle corresponding to the delay time of fuel injection, whereby the target advance angle can be obtained in response to the driving pulse.

As is shown in the above patents, various feedback control systems have been devised to provide rapid and responsive control of fuel injection systems used with internal combustion engines. With regard to heavy duty diesel engines, a primary objective with regard to a feedback control system for controlling fuel injection is economy. In addition, responsiveness to driver inputs for variations in power output of the engine must be rapid and responsive in a real time sense. A fuel injection system which provides instantaneous changes in fuel injection control signals would decrease delays in the fuel injection system resulting in improved fuel economy as well as improved responsiveness to driver throttle commands.

SUMMARY OF THE INVENTION

A method for decreasing delays in fuel injected internal combustion engines according to one aspect of the present invention includes the steps of (1) detecting a fueling request, (2) determining a fueling requirement based upon said fueling request, (3) producing a timed fueling signal in accordance with said fueling requirement, (4) continuously repeating steps (1) and (2) and altering the duration of the timed fueling signal before the expiration thereof.

A fuel injector controller for use with a fuel injected multi-cylinder internal combustion engine according to another aspect of the present invention comprises means for supplying fuel to the cylinders of the engine, the means for supplying including a plurality of fuel signal inputs each corresponding to a cylinder of the engine, the means for supplying responding to signals supplied to the fuel signal inputs and metering fuel to corresponding cylinders of the engine, circuit means responsive to the power output request signal and producing a fueling signal for each power stroke of each cylinder of the engine, the fueling signals supplied to corresponding ones of the fuel signal inputs, and wherein the duration of the fueling signals is altered in accordance with changes in the power output request signal.

One object of the present invention is to provide an improved method and apparatus for decreasing delays in a fuel injected internal combustion engine having a fuel injection control device.

Another object of the present invention is to provide instantaneous response to engine power output requests by instantaneously modifying fueling signals during the current engine cycle in accordance with throttle position input signals.

A further object of the present invention is to provide a fuel injection system having improved feedback responsiveness and improved fuel economy.

Other objects and advantages of the present invention will become more apparent from the following description of the preferred embodiment.

DESCRIPTION OF THE PREFERRED EMBODIMENT

Figure 1:
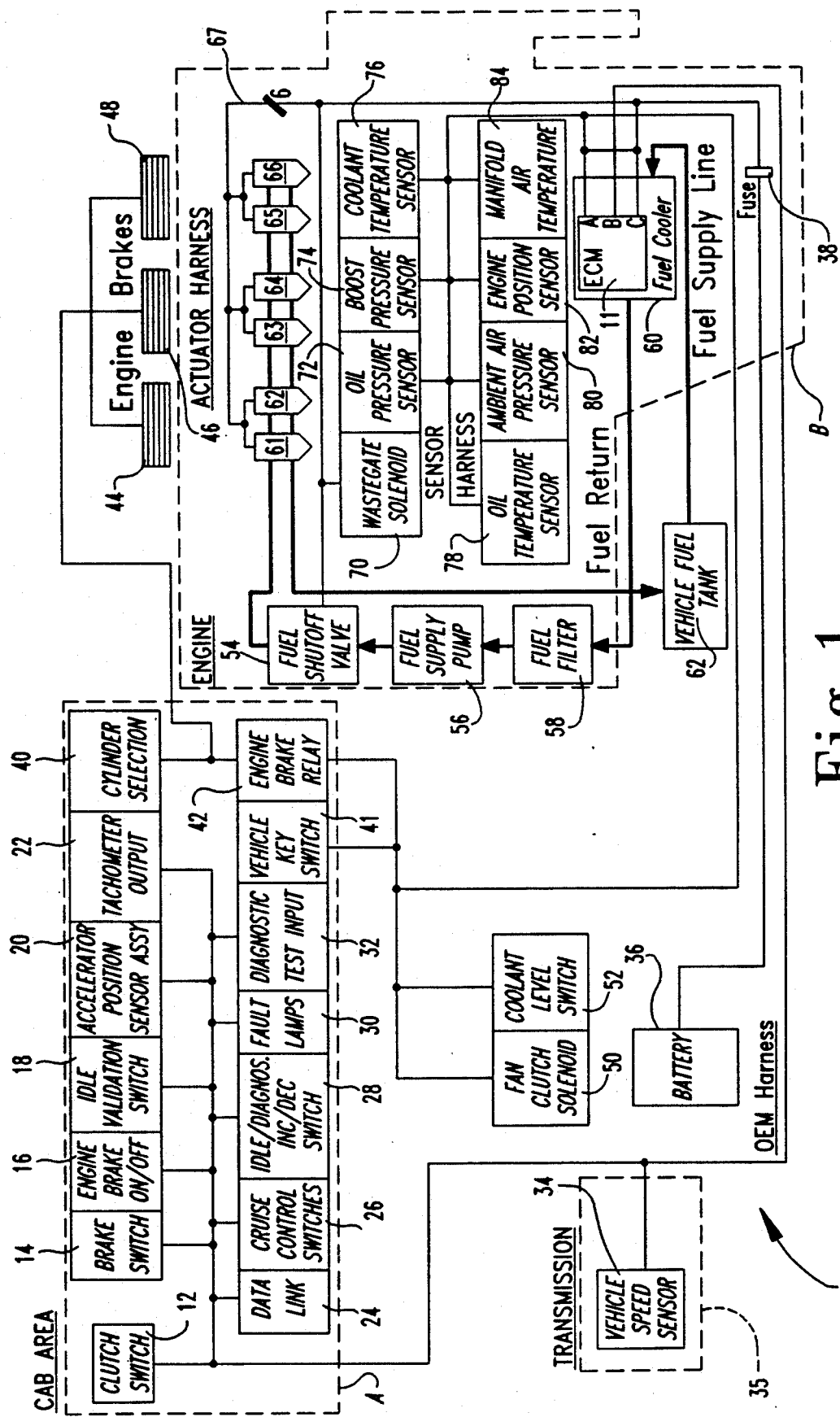
FIG. 1 is a diagrammatic illustration of an electric engine control device according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, an electronic engine control device 10 for decreasing delays in fuel injected engines according to the present invention is diagrammatically illustrated. The device 10 includes an engine control module 11 includes a microcomputer having digital and analog I/O capability and associated I/O interface circuitry. Input signals to the engine control module or ECM 11 from the cab area A include signals from the clutch switch 12, brake switch 14, engine brake on/off switch 16, idle validation switch 18, accelerator position sensor assembly 20, cruise control switches 26, and diagnostic test input 32. In addition, a data connection or serial data link 24 is provided to enable exchange of data between external processors and ECM 11. Tachometer output 22 provides an indication of engine speed to the driver. Idle/diagnostics INC/DEC switch 28 provides diagnostics operation capability. Fault lamps 30 are illuminated by ECM 11 in response to various sensed parameters or engine operating conditions. Diagnostic test input 32 is provided to enable diagnostic analysis of the device 10. ECM 11 receives a vehicle speed signal from vehicle speed sensor 34 located within transmission 35. Battery 36 supplies power to the device 10 and the other electrical systems of the vehicle. Fuse 38 is situated in series with a power signal from battery 36 to prevent damage to wiring in during excess current flow conditions.

Cylinder selection device 40 and engine brake relay 42 are enabled by vehicle key switch 41. Once enabled by key switch 41, the device 40 and relay are controlled by ECM 11. The engine brake apparatus of compression brake actuators 44, 46, and 48 are controlled by the cylinder selection device 40 and provide three separate engine braking levels in the form of two, four, or six cylinders of engine braking. Fan clutch solenoid 50 is controlled by ECM 11. Fan clutch solenoid 50, when engaged, engages operation of a cooling fan (not shown) resulting in additional cooling of the radiator (not shown). Coolant level switch 52 provides an input to ECM 11 indicative of the level of coolant in the cooling system (not shown) of the engine B. Devices closely associated with the engine or mounted on the engine are contained within the broken line depicting engine B. Fuel shutoff valve 54 is directly controlled by ECM 11 and disrupts fuel supply to the fuel injectors 61-66. Fuel supply pump 56 and fuel filter 58 are in line and in fluid communication with the vehicle fuel tank 62. Fuel cooler 60 is designed to cool the fuel, as well as maintain a safe operating temperature environment for ECM 11. Electro-mechanical fuel injectors 61-66 are individually controlled by ECM 11. Six control signals present in signal bus 67 provide individual control signals (shown in FIG. 2) to the fuel injectors 61-66. Engine operating conditions are sensed via oil pressure sensor 72, manifold boost pressure sensor 74, engine coolant temperature sensor 76, oil temperature sensor 78, ambient air pressure sensor 80, engine speed and position sensor 82, and manifold air temperature sensor 84. In addition, waste gate solenoid 70 provides a means controlled by ECM 11 for releasing pressure developed in the intake manifold via a turbocharger (not shown).

During normal engine operation, ECM 11 monitors throttle position from accelerator position sensor assembly 20, coolant temperature via coolant temperature sensor 76, and manifold boost pressure via pressure sensor 74 as well as other input signals to determine the width of meter pulse signals supplied to fuel injectors 61-66. A "fuel map" stored in memory is utilized by ECM 11 to determine fuel injection quantities required in view of input signals such as coolant temperature, boost pressure, and throttle position to produce an appropriate engine speed or power response. Six separate fueling signals or meter pulse signals are produced by ECM 11 and supplied to the injectors 61-66 via signal bus 67. The fueling signals activate fuel injectors 61-66 to supply the desired or appropriate amount of fuel into the combustion chambers of the engine B. It is desirable to provide improved economy and responsiveness by shortening the duration of these signals when necessary, or to increase the duration of these signals in the present cycle of the engine rather than waiting for the next or subsequent combustion stroke of the engine to respond and make such adjustments. This is the objective of the software algorithm discussed below and implemented through the hardware depicted in FIG. 1.

Figure 3:
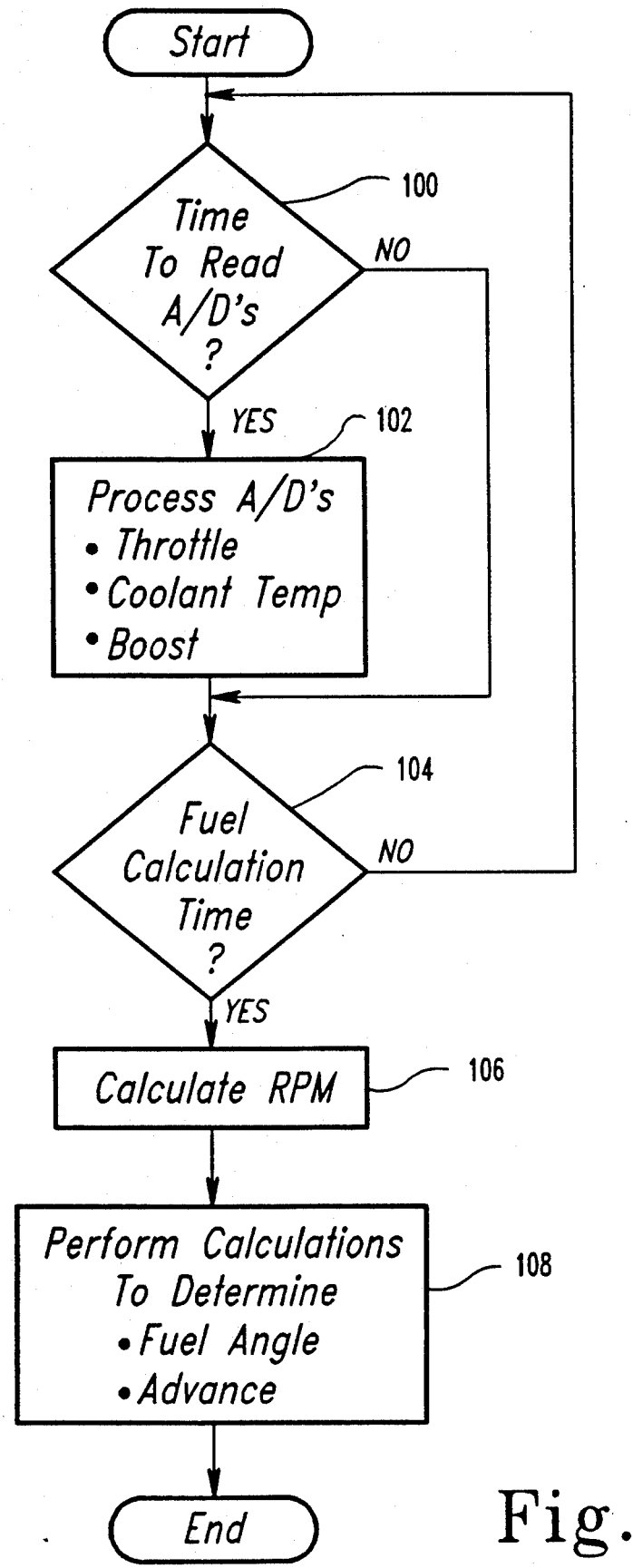
FIG. 3 is a flowchart of an algorithm for calculating fueling requirements.

Referring now to FIG. 3, a generalized flow diagram is shown for calculating fueling requirements for a fuel injected internal combustion engine. The routine depicted in FIG. 3 is repeatedly executed many times a second, for example every 16 milliseconds. Other timing intervals may produce adequate results, however in the present invention 16 milliseconds was selected as a preferred timing interval for making fueling calculations. At step 100 ECM 11 determines whether or not it is time to read or input values from an analog to digital converter (not shown) based upon a predetermined software sequencing algorithm. If it is time to process such inputs, then at step 102 the throttle position signal from sensor assembly 20, the coolant temperature signal from sensor 76, the oil pressure signal from sensor 72, and the boost pressure signal from pressure sensor 74 are digitized and placed into a memory location for use in calculating fueling requirements. If at step 100 it is not time to input the information from the sensors regarding fuel calculations, the program execution will continue with step 104. At step 104, the processor tests whether or not it is time to perform calculations regarding fuel injection quantities. If it is not time to perform new fuel calculations at step 104, program execution returns to step 100. If it is time to perform fueling calculations at step 104, program execution continues with step 106 wherein ECM 11 calculates RPM based upon signals from engine position sensor 82. Subsequently at step 108, calculations are performed to determine the fuel angle, i.e. the number of degrees of cam travel wherein a signal is supplied to the injectors 61-66. Cam travel is detected via sensor 82. The signals and their duration directly correspond with the amount of fuel supplied to the corresponding chambers or cylinders of the engine. Further, fuel injection timing in terms of an advance angle or injection timing angle relative to cam position is also determined at step 108. Fuel angle and advance angle are parameters typically associated with fueling operations of diesel engines.

Figure 4:
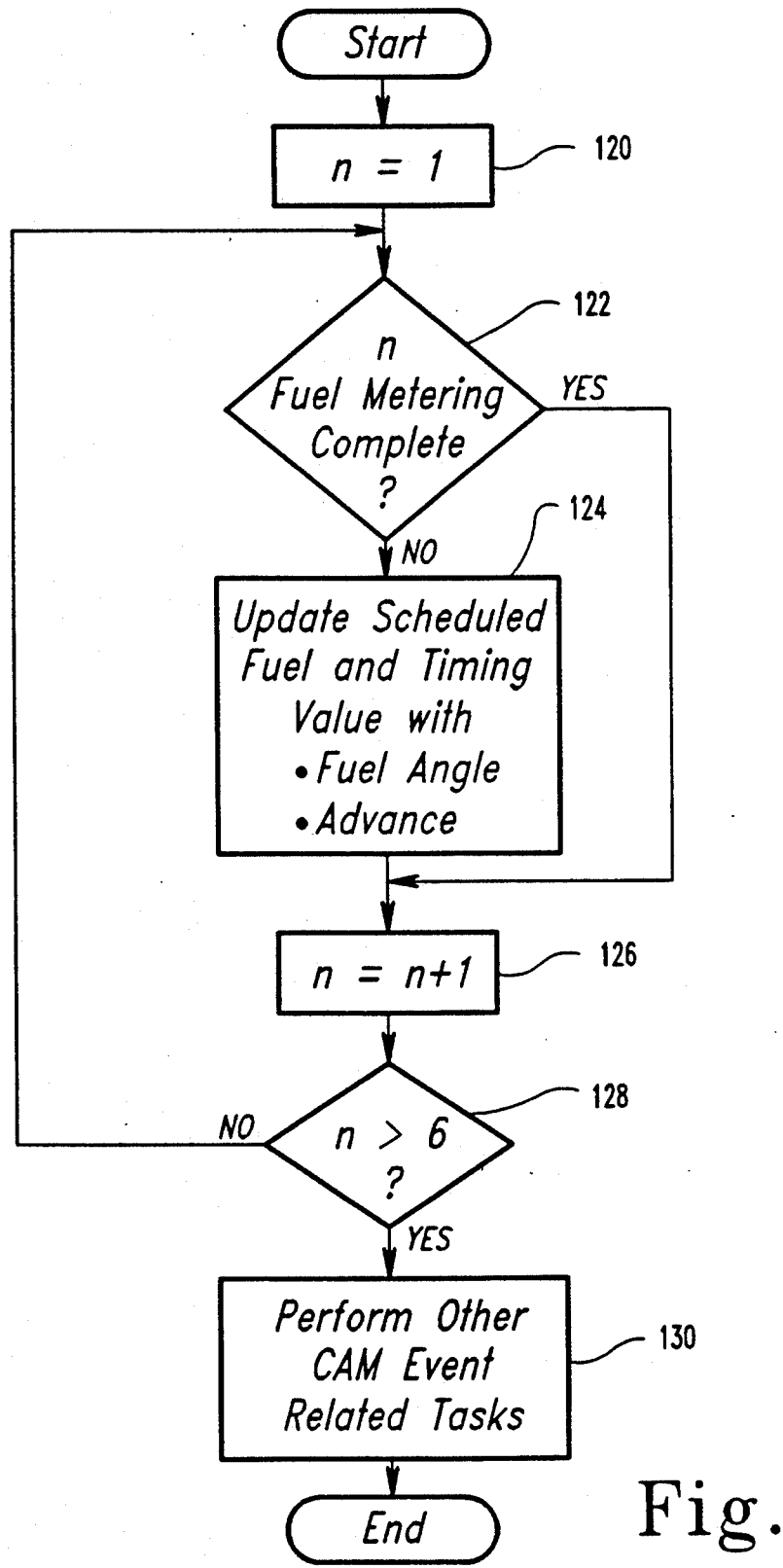
FIG. 4 is a flowchart of an algorithm for revising the duration of fueling signals supplied to the fuel injectors in accordance with a change in a fueling level request.

Referring now to FIG. 4, a flowchart for updating actual fueling signals to the injector 61-66 is shown. The algorithm or program depicted by this flowchart executes every 15 degrees of cam rotation. At step 120, a counter variable "n" is set equal to 1. Thereafter, at step 122, the value of "n", which corresponds to a particular cylinder, is tested to see if the fuel delivery or metering based upon the fuel angle determined at step 108 for that particular cylinder is completed. If fuel metering for that particular cylinder as shown in Table 1 is complete, then program execution will continue with step 126. On the other hand, at step 122 if fuel metering is not complete for the cylinder corresponding to the variable "n", then at step 124 ECM 11 will update the scheduled fuel and timing values based upon the fuel and advance angle calculated in step 108 of FIG. 3. Thereafter, as step 126, the variable "n" is incremented by 1 and at step 128 if the value of "n" is greater than 6, then program execution continues at step 130. If "n" is less than or equal 6 then program execution will return to step 122 after step 128. At step 130, ECM 11 will perform other cam event related tasks, for example period measurement of the signal from sensor 82 to determine RPM.

TABLE 1

| n | Corresponding Cylinder |
|---|---|
| 1 | one |
| 2 | five |
| 3 | three |
| 4 | six |
| 5 | two |
| 6 | four |

Figure 2:
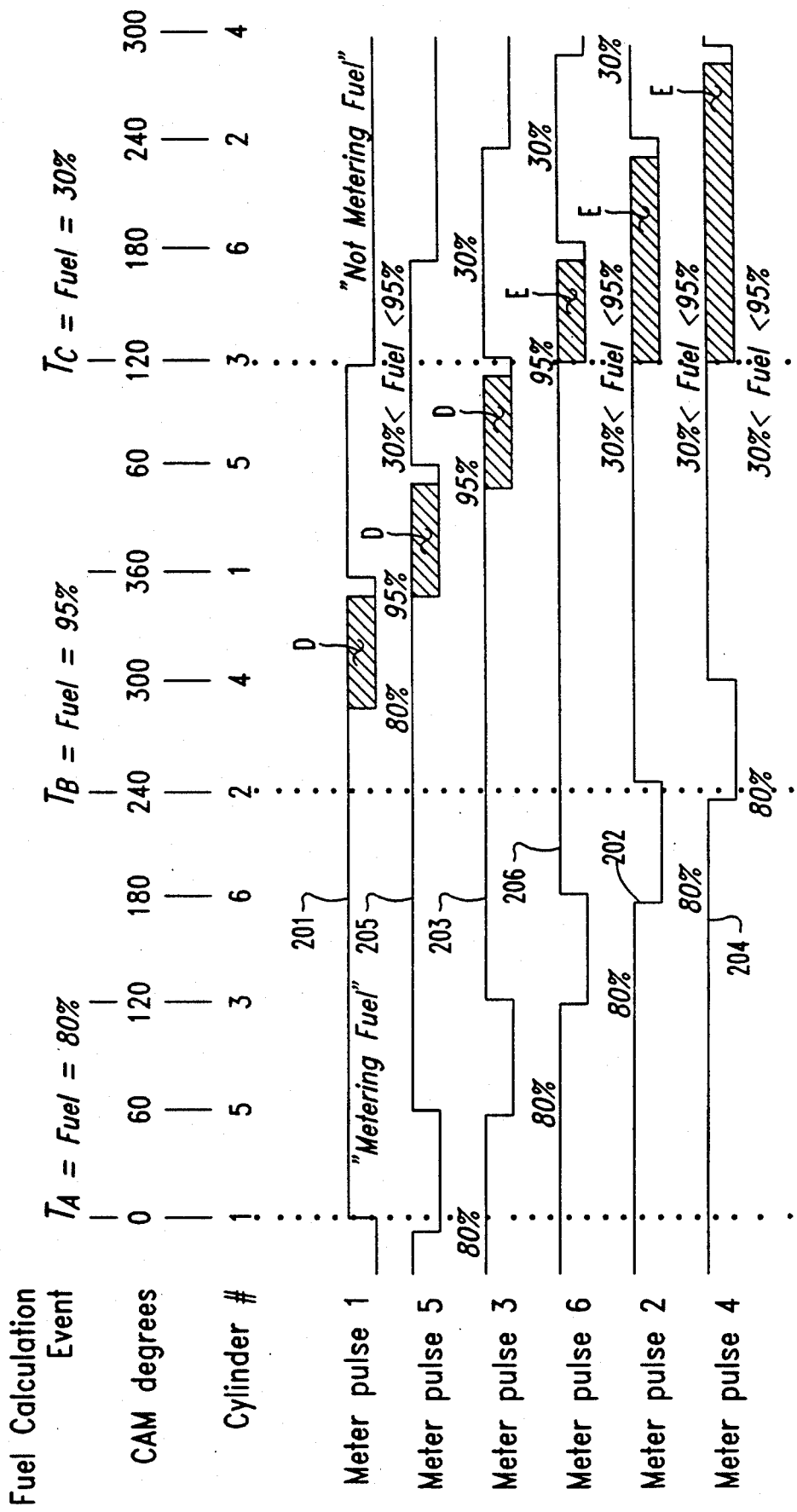
FIG. 2 is a timing diagram depicting fuel injector signals or meter pulses produced in response to three different fueling level requests.

Referring now to FIG. 2, a timing diagram depicting fuel injection metering pulses 201-206 supplied to fuel injectors 61-66, respectively, is shown. At time $T_A$ the fueling rate or level determined by the algorithm in FIG. 3 corresponds to an 80 percent fueling requirement, i.e. 80 percent of the maximum amount of fuel that may be supplied by the injectors 61-66 into the combustion chambers of the engine B. Since the timing diagram shown relates to the operation of a diesel engine, the most critical or important timing parameter is knowledge with regard to the position of each cylinder, and more particulary when top dead center position of each cylinders occurs. Engine position and speed are determined by ECM 11 via a signal received from sensor 82. This information is depicted by the row of numbers labeled "Cylinder #". Thus, at a cam degree position of 60 degrees, cylinder #5 is at top dead center. The fuel injection event in a diesel engine occurs at or near top dead center. The objective of the invention disclosed herein is to modify the duration of the meter pulses 201-206 supplied to the injectors 61-66 in accordance with the most recent fuel demand calculations. A more detailed discussion of electronic controls for diesel engines appears in *Cummins Electronic Controls For Heavy Duty Diesel Engines* by Ronald Lannan, Albert Sisson and William Wolber, which appeared in IEEE 88 CH2533-8, presented at the International Congress on Transportation Electronics, Convergence 88, Dearborn, Mich. Oct. 17-18, 1988, which articles is herein incorporated by reference.

At time $T_B$, the fueling requirement calculated in accordance with inputs to ECM 11 is modified from 80 percent to 95 percent. In accordance therewith, the pulse represented by curve 201 for cylinder #1 denoted "Meter pulse 1" is extended in time duration to enable more fuel to be delivered to cylinder #1 prior to top dead center conditions for cylinder #1, which occurs at a corresponding cam position of 360 degrees. A similar extension of another meter pulse curve 205 is also shown and meter pulse 3 (curve 203) between time $T_B$ and time $T_C$. The extended duration of the pulse corresponding to cylinders #1, 5 and 3 is denoted by the cross-hatched area labeled D. Since the change in fueling signal duration occurs instantaneously with regard to sensed inputs, the responsiveness of the engine and ability to deliver requested power immediately is enhanced and improved by the instantaneous change in fueling which occurs via revised fueling signals depicted by meter pulses 1, 5 and 3 (curves 201, 205 and 203, respectively).

Subsequently, at time $T_C$, the fueling requirement determined by ECM 11 in response to sensory inputs discussed in regard to FIG. 3 is reduced from a 95 percent fueling requirement to a 30 percent fueling requirement. In response to the information sensed at time $T_C$, ECM 11 immediately modifies fuel metering pulses 6, 2 and 4 (curves 206, 202, and 204, respectively) so that the metering pulses corresponding thereto reflect a fueling demand of only 30 percent. Thus, it is apparent that the meter pulses 6, 2 and 4 modified where possible at time $T_C$ so that the duration of the fueling signals is shortened by the corresponding cross-hatched areas labeled $E_1$ and immediate conservation of fuel occurs with regard to the current desired fueling rate for engine B.

The block diagram shown in FIG. 1 corresponds with an electronic diesel engine control system manufactured by Cummins Electronics Company, Inc. and Cummins Engine Company, Inc., of Columbus, Ind., and marketed under the trade name of CELECT.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fuel injection controller for use with a fuel injected multi-cylinder internal combustion engine, said fuel injection controller comprising:
   throttle means for producing a throttle signal corresponding to a desired engine power output level;
   means for sensing engine position and producing a position signal corresponding with engine camshaft rotational position;

means for sensing engine coolant temperature and producing a temperature signal in response thereto;

means for sensing air pressure of the intake manifold of the engine and producing a pressrue signal in response thereto;

means for supplying fuel to the cylinders of the engine; said means for supplying including a plurality of fuel signal inputs each corresponding to a cylinder of the engine, said means for supplying responding to signals supplied to said fuel signal inputs and metering fuel to corresponding cylinders of the engine;

circuit means responsive to said throttle signal, said temperature signal, and pressure signal and said engine position signal and producing a fueling signal for each power stroke of each cylinder of the engine, said fueling signals supplied to corresponding one fo said fuel signal inputs;

wherein said circuit means is a microcomputer including RAM, ROM, analog to digital converter means and digital I/O, and wherein said microcomputer calculates a duration time interval corresponding to said fueling signals in accordance with said temperature signal, said pressure signal, and said throttle signal and wherein said microcomputer repeatedly calculates said duration time before the expiration of each of said fueling signals so that the duration of each of said fueling signals is altered immediately in accordance with changes in said temperature signal, said pressure signal, and said throttle signal when neccessary.

2. A device for controlling fuel injection in connection with a mulit-cylinder internal combustion engine, said device comprising:

temperature sensor means for producing a temperature signal corresponding to coolant temperature of the engine;

pressure sensor means for producing a pressure signal corresponding to intake manifold air pressure of the engine;

accelerator sensor means for producing a power signal corresponding to power output desired from the engine in response to actuation of said accelerator sensor means by an operator of the engine;

means for sensing engine position and producing a position signal corresponding to engine camshaft rotational position;

means for sensing engine speed and producing a speed signal in accordance therewith;

a plurality of fuel injectors corresponding one for one with the cylinders of the engine, wherein each of said fuel injectors includes a fueling input and wherein said fuel injectors supply fuel to the corresponding cylinders of the engine in accordance with the duration of signals supplied to said fueling inputs;

a microcomputer including analog to digital converter means for inputting analog signals, digital I/O, ROM and RAM, said microcomputer being responsive to said power signal, said position signal, said temperature signal, said pressure signal and said speed signal, said microcomputer producing a plurality of fueling signals and supplying one of said plurality of fueling signals to a corresponding one of said fueling inputs of said plurality of fuel injectors prior to each power stroke of the corresponding cylinder of the engine, said microcomputer responding to changes in said power signal, said temperature signal, said pressure signal and said speed signal to shorten or lengthen the duration of each of said plurality of fueling signals accordingly before the expiration of each of said plurality of fueling signals;

wherein said microcomputer includes a fuel map in ROM for determining the appropriate duration for each of said plurality of fueling signals in response to said power signal, said temperature signal, said pressure signal, and said speed signal.

3. The device of claim 2 wherein said engine is a Diesel engine.

4. A fuel injection controller for use with a fuel injected multi-cylinder internal combustion engine, said fuel metering device comprising:

throttle means for producing a throttle signal corresponding to a desired engine power output level;

means for supplying fuel to the cylinders of the engine, said means for supplying including a plurality of fuel signal inputs each corresponding to a cylinder of the engine, said means for supplying responding to signals supplied to said fuel signal inputs and metering fuel to corresponding cylinders of the engine;

circuit means responsive to said throttle signal and producing a fueling signal for each power stroke of each cylinder of the engine, said fueling signals supplied to corresponding ones of said fuel inputs; and wherein the duration of each of said fueling signals is altered immediately in accordance with changes in said throttle signal.

5. The fuel injection controller of claim 4 wherein said means for supplying fuel are electro-mechanical fuel injectors and said circuit means is a microcomputer including RAM, ROM, analog I/O and digital I/O.

6. The device of claim 4 including:

means for sensing engine position and producing a position signal corresponding with engine camshaft rotational position;

means for sensing engine coolant temperature and producing a temperature signal in response thereto;

means for sensing air pressure of the intake manifold of the engine and producing a pressure signal in response thereto; and wherein said circuit means is responsive to said temperature signal, said pressure signal, said engine position signal, and said throttle signal in producing said fueling signals.

7. A method of controlling the supply of fuel to an internal combustion engine comprising the steps of:

(1) receiving a fueling request;

(2) determining a fueling requirement based upon said fueling request;

(3) producing a fueling signal for each power stroke of the engine in accordance with said fueling requirement;

(4) continuously repeating steps (1) and (2) and altering the duration of said fueling signal before the expiration thereof.

8. The method of claim 7 including the steps of:

providing a means for sensing coolant temperature;

providing a means for sensing engine camshaft position;

providing a means for sensing air pressure within the intake manifold of the engine; and wherein steps (2) includes determining a fueling requirement based upon said sensed coolant temperature, said sense camshaft position, said sensed air pressure and said fueling request.

9. The method of claim 8 wherein said fueling request is produced by an accelerator sensor.

10. The method of claim 9 wherein the engine is a multi-cylinder engine and a fueling signal is produced for each cylinder of the engine.

11. A device for controlling fuel injection in connection with a multi-cylinder internal combustion engine, said device comprising:

accelerator sensor means for producing a power signal corresponding to power output desired from the engine in response to actuation of said accelerator sensor means by an operator of the engine;

means for sensing engine position and producing a position signal corresponding to engine camshaft rotational position;

a plurality of fuel injectors corresponding one for one with the cylinders of the engine, wherein each of said fuel injectors includes a fueling input and wherein said fuel injectors supply fuel to the corresponding cylinders of the engine in accordance with the duration of signals supplied to said fueling inputs;

controller means responsive to said power signal and said position signal for supplying signals to each of said fueling inputs of said plurality of fuel injectors, said controller means producing a plurality of fueling signals and supplying one of said plurality of fueling signals to a corresponding one of said plurality of fuel injectors prior to each power stroke of the corresponding cylinder of the engine, said controller means responding to changes in said power signal to shorten or lengthen the duration of each of said plurality of fueling signals accordingly before the expiration of each of said plurality of fueling signals.

12. The device of claim 11 wherein said controller means is a microcomputer including analog to digital converter means, digital I/O, ROM, and RAM.

13. The device of claim 12 including:

temperature sensor means for producing a temperature signal corresponding to coolant temperature of the engine;

pressure sensor means for producing a pressure signal corresponding to intake manifold air pressure of the engine; and wherein said microcomputer means is responsive to said temperature signal and said pressure signal in addition to said power signal in producing said plurality of fueling signals.

14. The device of claim 11 including:

temperature sensor means for producing a temperature signal corresponding to coolant temperature of the engine;

pressure sensor means for producing a pressure signal corresponding to intake manifold air pressure of the engine; and wherein said controller means is responsive to said temperature signal and said pressure signal in addition to said power signal in producing said plurality of fueling signals.

15. The device of claim 14 wherein said controller means is a microcomputer including analog to digital converter means for inputting analog signals, digital I/O, ROM and RAM.

16. The device of claim 15 including means for sensing engine speed and producing a speed signal in accordance therewith and wherein said controller means is also responsive to said speed signal in producing said plurality of fueling signals.

* * * * *

UNITED STATES PATENT AND TRADEMARK OFFICE
CERTIFICATE OF CORRECTION

PATENT NO. : 5,137,000

DATED : August 11, 1992

INVENTOR(S) : Mark R. Stepper et al.

It is certified that error appears in the above-identified patent and that said Letters Patent is hereby corrected as shown below:

In column 1, line 15, please delete "outputs" and insert in lieu thereof --output--.
In column 3, line 57, please insert --42-- between "relay" and "are".
In column 3, line 58, please delete "of" and insert in lieu thereof --or--.
In column 4, line 64, please delete "the" and insert in lieu thereof --then--.
In column 6, line 7, please delete "IEEE" and insert in lieu thereof --IEEE--.
In column 6, line 22, please delete "pulse" and insert in lieu thereof --pulses--.
In column 6, line 42, please insert --are-- between "4" and "modified".
In column 7, line 14, please delete "and" and insert in lieu thereof --said--.
In column 7, line 18, please delete "fo" and insert in lieu thereof --of--.
In column 7, line 33, please delete "mulit-cylinder" and insert in lieu thereof --multi-cylinder--.

Signed and Sealed this

Fourteenth Day of December, 1993

Attest:

BRUCE LEHMAN

Attesting Officer

Commissioner of Patents and Trademarks